United States Patent Office 3,542,731
Patented Nov. 24, 1970

---

3,542,731
HETEROCYCLIC AROMATIC POLYESTERS
Billy M. Culbertson, Burnsville, Minn., assignor to Ashland Oil & Refining Company, Ashland, Ky., a corporation of Kentucky
No Drawing. Continuation of application Ser. No. 603,757, Dec. 22, 1966. This application Oct. 2, 1969, Ser. No. 863,317
Int. Cl. C08g 17/02
U.S. Cl. 260—47    5 Claims

ABSTRACT OF THE DISCLOSURE

Aromatic polyesters represented by repeating units having the formula

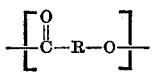

wherein R is a divalent heterocyclic aromatic radical have been prepared through self-condensation of hydroxy and acyloxy heterocyclic substituted carboxylic acid. The polymers are useful as adhesives, molding resins and in the formation of fibers and films.

---

This application is a continuation of Ser. No. 603,757, filed Dec. 22, 1966 and now abandoned.

This invention relates to novel polyesters containing heteroaromatic units along the polymer chain.

One of the principal types of polymers is the polyester in which recurring units are joined to one another by means of a carboxyl linkage. These materials may be prepared by the condensation of dicarboxylic acids with glycols or by the self-condensation of a hydroxyl acid. Equivalent materials are frequently employed in order to gain certain processing advantages. For example, a dicarboxylic acid dichloride or dialkyl ester of the dicarboxylic acid may be employed in place of the dicarboxylic acid. The polymerized product is a highly desirable thermoplastic material which is frequently employed in the manufacture of films and fibers but which usually suffers the disadvantage of being thermally unstable in the sense that the polymer degrades at lower temperatures than many other types of polymers. It has now been found that a polyester can be made having a remarkably high thermal stability. In general, this is accomplished by employing heteroaromatic moieties along the polymer chain as the essential recurring unit.

It is an object of this invention to provide a novel class of polyesters as a composition of matter.

It is another object of this invention to provide novel polyesters having a high degree of thermal stability.

It is another object of this invention to provide a process for preparing the novel polyesters of this invention.

It is still another object of this invention to provide novel polyesters comprising recurring heteroaromatic units.

Still other objects will be apparent from the more detailed description of this invention which follows.

This invention provides a novel polyester which is substantially free of aliphatic hydrocarbyl groups along the main polymer chain and which consists essentially of recurring units of the formula:

wherein R is a divalent radical consisting, at least in part, of a heterocyclic ring having one or more heteroatoms selected from the group consisting of oxygen, nitrogen, and sulfur, said radical being selected from the group consisting of (1) a fused ring system comprising at least one aromatic ring and at least one heterocyclic ring, and (2) a nonfused ring system in which the heterocyclic ring is unsaturated.

In certain preferred embodiments of this invention, the polyester is one in which R in the above formula is a phthalimide, a quinoxaline, a benzoxazole, a benzothiazole, a benzimidazole, an oxadiazole, a thiadiazole, or a triazole.

The polyesters of this invention are prepared by the self-condensation of one or more alkyl carboxyl heteroaromatic acids of the formula:

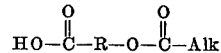

wherein Alk is a lower alkyl and R is a divalent radical consisting, at least in part, of a heterocyclic ring having one or more heteroatoms selected from the group consisting of oxygen, nitrogen, and sulfur, said radical being selected from the group consisting of (1) a fused ring system comprising at least one aromatic ring and at least one heterocyclic ring, and (2) a nonfused ring system in which the heterocyclic ring is unsaturated. The process involves condensing the acid with itself at a temperature of about 200°–300° C. preferably in the presence of a catalyst and at a reaction pressure which is subatmospheric. The process of this invention normally passes through two succeeding stages. In the first stage, the polyester is a molten material and the polymerization takes place at a reaction temperature of about 200°–300° C. In the second stage, the polyester is a solid material and the polymerization is continued at a temperature of about 300° C. or higher.

The products of this invention are thermoplastic polyesters which range in molecular weight from low to high and are useful for the preparation of films, fibers, shaped articles, molded objects, and the like. Because of the high degree of thermal stability, these products are particularly useful in applications where elevated temperatures are involved, thus making the polyesters of this invention particularly useful for molding and extrusion operations. The lower molecular weight materials may be employed as coating and adhesive compositions.

The recurring units which make up the polyester of this invention are heteroaromatic. The word "heteroaromatic" as used in the description of this invention means a heterocyclic structure having an aromatic character. The heteroatoms which are encompassed in this invention are oxygen, nitrogen, and sulfur. The aromatic character of the unit is that combination of electronic structure which causes the unit to have similarities to benzene or other well recognized aromatic compounds. The generally accepted theories of chemistry today relate aromatic character to the presence of pi electrons which, in turn, produce a resonance in the cyclic structure that resembles, to a greater or lesser degree, the resonance found in benzene. Thus, many heterocyclic structures are considered to be aromatic even though they do not have the conjugated unsaturation and, therefore, do not have the same electron structure and same high degree of resonance found in benzene. In the description of this invention, it is considered that a heterocyclic structure which has at least one unsaturated linkage and which has oxygen, nitrogen, or sulfur as a heteroatom, is aromatic. There are other structures in which the heterocycle is not unsaturated and yet the compound is aromatic. This type of compound involves a fused ring structure, one portion of which is an aromatic ring, such as benzene, and the other portion is a saturated heterocyclic structure. A typical example of such a compound in phthalimide. The term "heteroaromatic" is, therefore, also intended to include unsaturated heterocyclic structures as well as fused ring structures in which at least one of the rings is aromatic and at least one of the rings is heterocyclic, either saturated or unsaturated. While a single ring may be both heterocyclic and aromatic, e.g., pyridine, there are many compounds used in this invention having two or more rings, fused or not fused, in which one ring is an aromatic carbocycle while a different ring is heterocyclic.

The polymers of this invention are prepared by the self-condensation of a heteroaromatic compound which has a carboxylic acid group and which also has available for condensation with that carboxylic acid group a hydroxyl group or an alkylcarboxy group. These two general types of compounds are referred to herein as a hydroxyheteroaromatic acid and an alkylcarboxyheteroaromatic acid. The polymerization is normally carried out at elevated temperatures and in the presence of a polymerization catalyst through phases during which the polymerizing material changes from a molten mass to a solid mass as the polymerization continues.

The polymerization temperatures will normally range from about 200°–300° C. although higher temperatures may be reached as the polymerization approaches completion. During the molten phase, the polymerizing materials are in the form of a liquid melt at a temperature of about 200°–300° C. The polymerizing material gradually solidifies, and the polymerization is continued in the solid phase, at temperatures of about 300° C. or higher.

While it is not necessary, it is usually preferred to employ a polymerization catalyst in order to obtain a better polymerization rate. The catalysts which may be employed are those known to be suitable for the preparation of polyesters by condensation reactions. These catalysts include materials such as magnesium, zinc chloride, zinc oxide; the alkali metal oxides such as sodium oxide and potassium oxide; and the alkaline earth oxides such as magnesium oxide, calcium oxide, barium oxide, and the like. Still other specific compounds may be apparent to those skilled in this art.

The polymerization reaction may be operated at any suitable pressure, whether it be subatmospheric, atmospheric, or superatmospheric, although the first of these is preferred. The use of a reduced pressure aids the reaction by removing the condensed water or acid formed during the polymerization, thus reducing the reaction time. A further advantage of reduced pressures is that higher molecular weight products are more easily obtained than when employing higher pressures.

Other reaction conditions need no special explanation. The concentration of monomeric materials is not a critical feature of this process since all materials react in accordance with a balanced stoichiometry. The reaction time is that which is necessary to produce the desired molecular weight under the chosen polymerization conditions. In general, the reaction times will be several hours in length with longer reaction times producing products of higher molecular weight. The atmosphere in which the polymerization reaction takes place is preferably one which minimizes the possibility of oxidation. In order to accomplish this objective, it may be advantageous, therefore, to employ an inert atmosphere, such as nitrogen; or if such an inert atmosphere is not available to employ a reduced pressure, as mentioned previously.

The products which are prepared in accordance with this invention are linear, high molecular weight heteroaromatic polyesters having high melting points, high resistance to solvents, and high thermal stabilities. These materials are useful as molding plastics, adhesives, laminating resins, electrical coatings, and the like. The generalized formula for the polymer is:

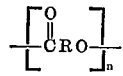

wherein R is the heteroaromatic residue. This generalized formula is intended to cover homopolymers where the chemical nature of R is the same throughout the polymer, as well as copolymers, terpolymers, and the like, where the chemical nature of R is not the same throughout the entire polymer. When a high degree of thermal stability is desired, the entire polymer chain should be made up of aromatic linkages, i.e., carbocyclic aromatic or heteroaromatic. When a high degree of thermal stability is not imperative, comonomers may be employed which are nonaromatic.

The heteroaromatic residue which is a recurring unit in the polymer chain of the product of this invention is any specific compound from many classes of materials such as imides, quinoxalines, quinazolinediones, benzoxazoles, benzothiazoles, benzimidazoles, oxadiazoles, thiadiazoles, triazoles, thiazoles, isocyanurates, pyridines, etc. The monomeric materials employed to prepare these polymers are even more diverse in nature than the recurring units. The most common monomeric material is a hydroxyacid which, after self-condensation, results in the polymeric unit shown in the above generalized formula. A modified form of the monomer in which the hydroxyl group is replaced by an ester is a preferred embodiment since such a monomer reacts faster and produces a higher molecular weight product. Any lower alkanoic acid ester is suitable for this purpose, preferably the acetate ester. In the case of certain special polymeric structures, two monomeric precursors are employed which not only form the polyester linkages but also cyclize internally to produce the recurring heteroaromatic residue in the polymer product. Furthermore, when it is desired to prepare copolymers and terpolymers of various characteristics, hydroxyaromatic acids such as hydroxybenzoic acid, hydroxynaphthoic acid, and the like, may be employed as aromatic comonomers, and hydroxyaliphatic acids such as hydroxyacetic acid and hydroxybutyric acid may be employed as non-aromatic comonomers. Other equivalent monomeric compounds will be apparent to those skilled in the art, e.g., a combination of dicarboxylic acids and glycols.

Since the chemical nature of the recurring unit in the polymer chain can be varied considerably without departing from its heteroaromatic character, it is not feasible to list all possible variations. Several of the more important types are shown below with an indication of the monomers and precursor units which may be employed to incorporate such structures into the polymer chain. Most of the specifically named compounds include hydroxyphenyl or acetoxyphenyl as an aromatic radical attached to a heterocyclic moiety. In order to keep this listing from being unduly long, aromatic rings other than phenyl, e.g., naphthyl, pyridyl, quinolyl, etc., and alkylcarboxy groups other than acetoxy, e.g., formoxy, propionoxy, butyroxy, etc., are to be understood as equivalents.

(I) IMIDES

The polymeric structure employing this type of recurring unit has the formula:

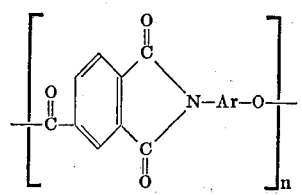

wherein Ar is an aryl or a heteroaryl structure. The monomer employed in preparing this polymer is the corresponding hydroxyacid or lower alkylcarboxy acid having the formula:

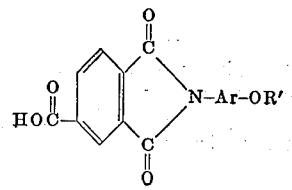

wherein R' is hydrogen or lower alkanoyl. Specific compounds which are included within this monomeric formula are:

N-(p-hydroxyphenyl)trimellitimide
N-(p-acetoxyphenyl)trimellitimide
N-(m-hydroxyphenyl)trimellitimide
N-(m-acetoxyphenyl)trimellitimide
N-(o-hydroxyphenyl)trimellitimide
N-(o-acetoxyphenyl)trimellitimide Another type of precursor, which produces the same polymeric structure, are the trimellitic amides of substituted aromatic amines. These materials have the following formula:

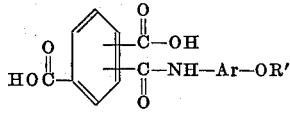

wherein Ar and R' have the same definitions as given above. Specific compounds of this formula are:

N-(p-hydroxyphenyl)-1-trimellitamide
N-(p-hydroxyphenyl)-2-trimellitamide
N-(p-acetoxyphenyl)-1-trimellitamide
N-(p-acetoxyphenyl)-2-trimellitamide
N-(m-hydroxyphenyl)-1-trimellitamide
N-(m-hydroxyphenyl)-2-trimellitamide
N-(m-acetoxyphenyl)-1-trimellitamide
N-(m-acetoxyphenyl)-2-trimellitamide (II) QUINOXALINES The polymer having this structure as a recurring unit has the general formula:

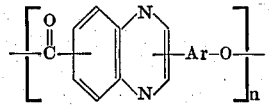

wherein Ar is an aryl or a heteroaryl structure. The monomeric materials, which produce this structure, are the corresponding hydroxyacids and lower alkylcarboxy acids. Specific compounds which may be employed as the monomer units to prepare this polymer include:

2-(p-hydroxyphenyl)-6-carboxyquinoxaline
2-(p-hydroxyphenyl)-7-carboxyquinoxaline
2-(p-acetoxyphenyl)-6-carboxyquinoxaline
2-(p-acetoxyphenyl)-7-carboxyquinoxaline
2-(m-hydroxyphenyl)-6-carboxyquinoxaline
2-(m-hydroxyphenyl)-7-carboxyquinoxaline
2-(m-acetoxyphenyl)-6-carboxyquinoxaline
2-(m-acetoxyphenyl)-7-carboxyquinoxaline
2-(o-hydroxyphenyl)-6-carboxyquinoxaline
2-(o-hydroxyphenyl)-7-carboxyquinoxaline
2-(o-acetoxyphenyl)-6-carboxyquinoxaline
2-(o-acetoxyphenyl)-7-carboxyquinoxaline (III) QUINAZOLINEDIONES The polymer having this structure as its recurring unit has the general formula:

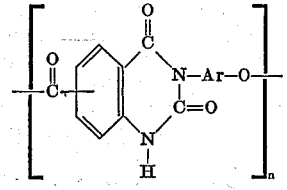

wherein Ar is an aryl or heteroaryl structure. Among the monomeric material which may be employed to prepare this polymer are the corresponding hydroxyacids and the lower alkylcarboxy acids. Specific compounds of this type include:

7-carboxy-3-(p-acetoxyphenyl)quinazolinedione
7-carboxy-3-(m-acetoxyphenyl)quinazolinedione
7-carboxy-3-(o-acetoxyphenyl)qinazolinedione
7-carboxy-3-(p-hydroxyphenyl)quinazolinedione
7-carboxy-3-(m-hydroxyphenyl)quinazolinedione
7-carboxy-3-(o-hydroxyphenyl)quinazolinedione
6-carboxy-3-(p-acetoxyphenyl)quinazolinedione
6-carboxy-3-(m-acetoxyphenyl)quinazolinedione
6-carboxy-3-(o-acetoxyphenyl)quinazolinedione
6-carboxy-3-(p-hydroxyphenyl)quinazolinedione
6-carboxy-3-(m-hydroxyphenyl)quinazolinedione
6-carboxy-3-(o-hydroxyphenyl)quinazolinedione A monomer precursor which can be employed to prepare the above polymer is a substituted urea having the formula:

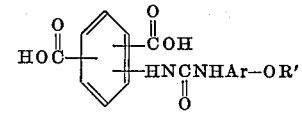

wherein Ar has the above meaning and R' is hydrogen or lower alkanoyl. Specific compounds of this type include:

N-(2,5-dicarboxyphenyl)-N'-(p-acetoxyphenyl)urea
N-(2,5-dicarboxyphenyl)-N'-(m-acetoxyphenyl)urea
N-(2,5-dicarboxyphenyl)-N'-(p-hydroxyphenyl)urea
N-(2,5-dicarboxyphenyl)-N'-(m-hydroxyphenyl)urea
N-(2,4-dicarboxyphenyl)-N'-(p-actoxyphenyl)urea
N-(2,4-dicarboxyphenyl)-N'-(m-acetoxyphenyl)urea
N-(2,4-dicarboxyphenyl)N'-(p-hydroxyphenyl)urea
N-(2,4-dicarboxyphenyl)-N'-(m-hydroxyphenyl)urea (IV) BENZOXAZOLES, BENZOTHIAZOLES AND BENZIMIDAZOLES The polymer prepared with one of these structures as a recurring unit has the following general formula:

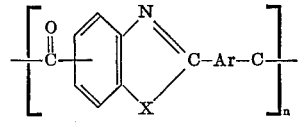

wherein Ar is aryl or heteroaryl and X is oxygen, sulfur, or imine, i.e., NH, N-alkyl, or N-aryl. One type of monomeric material which may be employed in the preparation of this polymer is the corresponding hydroxyacid or lower alkylcarboxy acid. Specific examples of such monomeric materials include the following benzoxazoles and the corresponding benzimidazoles and benzothiazoles:

2-(p-hydroxyphenyl)-5-carboxybenzoxazole
2-(p-acteoxyphenyl)-5-carboxybenzoxazole
2-(p-hydroxyphenyl)-6-carboxybenzoxazole
2-(p-acetoxyphenyl)-6-carboxybenzoxazole
2-(m-hydroxyphenyl)-5-carboxybenzoxazole
2-(m-acetoxyphenyl)-5-carboxybenzoxazole
2-(m-hydroxyphenyl)-6-carboxybenzoxazole
2-(m-acetoxyphenyl)-6-carboxybenzoxazole The same polymer recurring unit can be prepared by employing as a monomer precursor a substituted benzamide which upon condensation with itself not only forms the polyester linkage but also cyclizes to form the corresponding azole ring. Such precursors have the general formula:

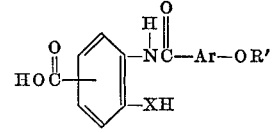

wherein Ar is aryl or heteroaryl, R' is hydrogen or lower alkanoyl, and X is oxygen, sulfur, NH, N-alkyl, or N-aryl. Specific compounds of this type include:

N-(2-hydroxy-4-carboxyphenyl)-p-acetoxybenzamide
N-(2-anilion-4-carboxyphenyl)-p-acetoxybenzamide
N-(2-mercapto-4-carboxyphenyl)-p-acetoxybenzamide
N-(2-hydroxy-4-carboxyphenyl)-p-hydroxybenzamide
N-(2-anilion-4-carboxyphenyl)-p-hydroxybenzamide
N-(2-mercapto-4-carboxyphenyl)-p-hydroxybenzamide

(V) OXADIAZOLES, THIADIAZOLES AND TRIAZOLES

A polymer prepared with any of these structures as its recurring unit has one of the general formulas given below, depending on whether the heterocycle is to have a 1,3,4-structure or a 1,2,4-structure:

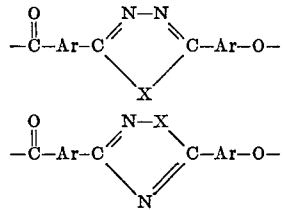

wherein Ar is aryl or heteroaryl and X is oxygen, sulfur, NH, N-alkyl, or N-aryl. Specific compounds which can be employed as the monomer in the preparation of these polymers include the following 1,3,4-oxadiazoles and the corresponding 1,3,4-thiadiazoles; 1,3,4-triazoles; 1,2,4-oxadiazoles; and 1,2,4-thiadiazoles:

2-(p-carboxyphenyl)-5-(p-hydroxyphenyl)1,3,4-oxadiazole
2-(m-carboxyphenyl)-5-(p-hydroxyphenyl)-1,3,4-oxadiazole
2-(m-carboxyphenyl)-5-(m-hydroxyphenyl)-1,3,4-oxadiazole
2-(o-carboxyphenyl)-5-(p-hydroxyphenyl)-1,3,4-oxadiazole
2-(o-carboxyphenyl)-5-(m-hydroxyphenyl)-1,3,4-oxadiazole
2-(o-carboxyphenyl)-5-(o-hydroxyphenyl)-1,3,4-oxadiazole
2-(p-carboxyphenyl)-5-(p-acetoxyphenyl)-1,3,4-oxadiazole
2-(m-carboxyphenyl)-5-(p-acetoxyphenyl)-1,3,4-oxadiazole
2-(m-carboxyphenyl)-5-(m-acetoxyphenyl)-1,3,4-oxadiazole
2-(o-carboxyphenyl)-5-(p-acetoxyphenyl)-1,3,4-oxadiazole
2-(o-carboxyphenyl)-5-(m-acetoxyphenyl)-1,3,4-oxadiazole
2-(o-carboxyphenyl)-5-(o-acetoxyphenyl)-1,3,4-oxadiazole A monomer precursor which may be employed in place of the above monomers and which forms the same polymer upon self-condensation is a substituted bis-hydrazide of the formula:

wherein Ar is aryl or heteroaryl and R' is lower alkanoyl. Specific compounds of this formula which produce polyesters with oxadiazole recurring units include the following:

p-acetoxyphenyl-3-carboxyphenyl-bis-hydrazide
p-hydroxyphenyl-3-carboxyphenyl-bis-hydrazide
p-acetoxyphenyl-4-carboxyphenyl-bis-hydrazide
p-hydroxyphenyl-4-carboxyphenyl-bis-hydrazide
m-acetoxyphenyl-3-carboxyphenyl-bis-hydrazide
m-hydroxyphenyl-3-carboxyphenyl-bis-hydrazide
m-acetoxyphenyl-4-carboxyphenyl-bis-hydrazide
m-hydroxyphenyl-4-carboxyphenyl-bis-hydrazide Corresponding polyesters with thiadiazole recurring units are produced by using on precursor monomers bis-hydrazides corresponding to the above, with thiocarbonyl groups replacing the carboxy groups in the hydrazide moiety. Similarly, polyesters with triazole units result from those monomer precursors where carboimine groups replace the carboxy groups in the hydrazide moiety.

(VI) MISCELLANEOUS

Other heteroaromatic structures may be incorporated into a polyester by employing the corresponding hydroxyacid or lower alkylcarboxy acid of such heteroaromatic structures as the monomer. In the interest of brevity these monomers are identified merely in terms of their heteroaromatic structure, without specifically indicating the location or identification of the acid group, the hydroxyl group, or the lower alkylcarboxy group which takes part in the polycondensation reaction forming the polymer. It is to be understood that many position isomers, such as those shown above with respect to specific classes of compounds, apply equally to the following:

pyridine            pyrrole
quinoline           benzopyrrole
acridine            carbazole
phenanthridine      pyran
phenazine           furan
1,3,4-triazine      benzofuran
1,2,4-triazine      thiophene
phenothiazine       benzothiophene
purine This invention may be more fully understood by reference to the following operative examples. Parts and percentages are by weight and temperatures are in degrees centigrade unless otherwise specified. It is to be understood that these examples are illustrative of certain embodiments of this invention and are not intended to be construed as limiting the scope of the invention in any manner whatsoever.

EXAMPLE 1

In this example a polyester was prepared having as the recuring heteroaromatic unit in the polymer chain, N-phenylphthalimide. The monomeric precursor was prepared by dissolving 7.0 g. of p-aminophenyl acetate in 75 ml. of Ar grade acetone. To the stirred acetone solution, 8.8 g. of trimellitic anhydride was added slowly at room temperature. The white solid material that precipitated from the acetone was collected by suction filtration, washed on the filter with a small amount of acetone and dried in vacuo (0.2 mm. Hg) for 2 hours to obtain a 14 g. yield (theory, 15.8 g.) of a mixture of the 1- and 2-p-acetoxyanilides of trimellitic acid M.P. 205°–212° C. Elemental analysis for $C_{17}H_{13}NO_7$. Calculated (percent): C, 59.47; H, 3.79; N, 4.08. Found (percent): C, 59.51; H, 4.21; N, 4.23. Formulas for these compounds are:

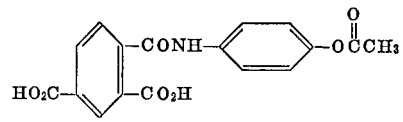

and

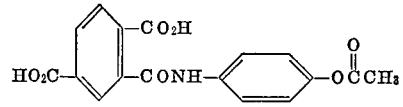

The infrared spectrum of the material had absorption bands characteristics of amide, ester, and carboxylic acid group functionality.

Under a nitrogen atmosphere, 2 g. of the above material was heated for 1 hour at about 260° C. Initially, the material melted and acetic acid fumes were detected in the effluent gases. After about 20 minutes, the mass solidified to a brown-colored solid which was removed from the reaction flask, ground fine in an agate mortar, and reheated in vacuo (0.5 mm. Hg) at 260°–350° C. for one hour. The dark brown polymer product which was soluble in concentrated sulfuric acid, had infrared absorption bands indicative of imide and ester group functionality.

Differential thermal analysis and thermogravimetric analysis indicated that the polymer melted at about 572° C. and was stable in nitrogen and in air to a temperature above 550° C. (less than 10% weight loss).

A 5 g. sample of the mixed 1-(p-acetoxyanilide) and 2-(p-acetoxyanilide) of trimellitic acid described above was dissolved in a mixture of 25 g. of dimethyl formamide, 1 g. of acetic anhydride, and 1 g. of pyridine, and heated to 80° C. for one hour. After cooling to room temperature, the DMF solution was poured into 400 ml. of water. The white precipitate was collected, washed several times with water, and dried in vacuo (0.2 mm. Hg) at 80° C. for 3 hours to obtain a 4.2 g. yield (theory, 4.7 g.) of N-(p-acetoxyphenyl) trimellitimide, M.P. 278°–280° C., have the formula:

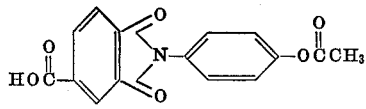

The infrared spectrum showed absorption bands indicative of imide, ester, and carboxylic acid group functionality. Elemental analysis agreed quite well with theory. Calculated for $C_{17}H_{11}NO_6$ (percent): C, 62.77; H, 3.38; N, 4.30. Found (percent): C, 62.50; H, 3.50; N, 4.15.

When N-(p-acetoxyphenyl) trimellitimide was heated (under nitrogen) at 280°–300° C. for one hour and at 300° C. in vacuo (0.5 mm. Hg) for one hour, a polymer was obtained which had the same infrared spectrum, solubility characteristics, thermal stability, etc., as the polymer described above. The polymer chain has the following recurring unit:

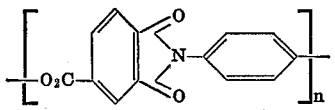

EXAMPLE 2

A polymer was prepared in this example which was similar to that of Example 1 except that the recurring unit was a position isomer of the one described in Example 1. The monomeric precursor was prepared by dissolving 10.9 g. of m-aminophenol in 70 g. of Ar grade acetone. To the stirred solution at room temperature, 19.2 g. of trimellitic anhydride was added slowly. The solution was allowed to evaporate overnight to obtain a quantitative yield of a yellow solid, M.P. 250° (start to soften 230° C.) to 275° C. The infrared absorption spectrum of the mixture had absorption peaks indicative of amide, hydroxyl (phenol) and acid functionality.

The crude product, in the amount of 29 g., which was assumed to be essentially a mixture of the 1- and 2-m-hydroxyanilides of trimellitic acid, was recrystallized from a solvent mixture consisting of 100 g. of xylene, 21 g. of acetic anhydride and 1 g. of pyridine. A sample suitable for elemental analysis was dried in vacuo (0.2 mm. Hg) for 4 hours at 100° C., M.P. 201°–202° C. Analysis for $C_{17}H_{11}NO_6$. Calculated (percent): C, 62.77; H, 3.38; N, 4.30. Found (percent): C, 62.52; H, 3.48; N, 4.15.

The infrared spectrum of the compound had absorption peaks at 1785, 1760, 1730, and 1675 cm.$^{-1}$, indicative of imide, ester, and acid functionality. This compound, N-(m-acetoxyphenyl) trimellitimide, had the formula:

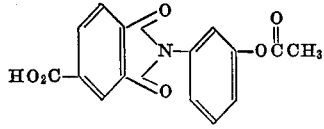

The monomeric compound N-(m-acetoxyphenyl) trimellitimide was heated under nitrogen in vacuo in the same manner as described in Example 1. The resulting polymer, which was readily soluble in concentrated sulfuric acid and had a polymer melt temperature of 360°–270° C. had infrared absorption bands indicative of only ester and imide group functionality. Different thermal analysis and thermogravimetric analysis studies indicated the polymer was stable (less 10% weight loss) to about 500° C. in either air or nitrogen as an atmosphere.

EXAMPLE 3

In this example a polyester was prepared having as the recurring unit 2-phenyl-benzoxazole. The monomeric precursor was prepared under a nitrogen atmosphere by dissolving 15.3 g. of 3-amino-4-hydroxybenzoic acid in 200 ml. of purified N-methyl-pyrrolidone. To the stirred solution, 19.8 of p-acetoxybenzoyl chloride was added slowly and the solution, 19.8 of p-acetoxybenzoyl chloride was added slowly and the solution was stirred at room temperature for one hour. The solution was poured into about 1 liter of vigorously stirred water and the tan-colored precipitate was collected by suction filtration. After washing the solid several times with hot water, it was dried overnight in air and then dried in vacuo (0.2 mm. HG) to obtain a tan-colored solid in a 28 g. (theory 31 g.) yield, M.P. 266°–270° C. The infrared spectrum of the material had absorption bands indicative of amide, ester (phenolic acetate), phenolic, and carboxylic acid functionality.

After recrystallization from N,N-dimethyl formamide (diluted slightly with water) and dried in vacuo (0.2 mm. Hg) at 100° C. the compound, M.P. 268°–270° C., was submitted for elemental analysis. Analysis for

Calculated (percent): C, 60.95; H, 4.12; N, 4.44. Found (percent): C, 61.69; H, 4.10; N, 4.27.

This compound was N-(2-hydroxy-5-carboxyphenyl)-4-acetoxybenzamide and had the following structure:

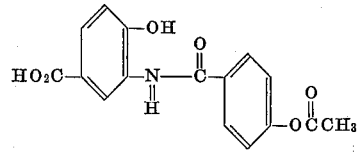

A sample of this monomeric benzamide was heated (nitrogen atmosphere) for one hour at 270°–300° C. and for one hour in vacuo (0.5 mm. HG) at 300° C. to obtain a dark grey-colored polymer having the following structure:

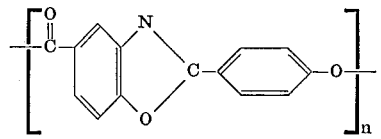

The infrared spectrum of the polymer which was readily soluble in concentrated sulfuric acid, had absorption bands at 1740 and 1620 cm.$^{-1}$ indicative of the ester and benzoxazole functionality.

Differential thermal and thermogravimetric analysis indicated the polymer melted at about 530° C. and had less than a 10% weight loss at temperatures up to 550° C. (in air or nitrogen).

EXAMPLE 4

This example describes the preparation of a polyester having a phenylquinoxaline group as the recurring unit. The monomer employed in the polymerization was prepared by forming a solution consisting of 22 g. of p-hydroxyphenylglyoxalyl hydrate and 100 ml. of deoxygenated water, which was then added with stirring at room temperature to a second solution consisting of 19.9 g. of 3,4-diaminobenzoic acid dissolved in 150 ml. of acidified (15 ml. conc. hydrochloric acid), deoxygenated water. Immediately after mixing the two solutions, a greenish-yellow precipitate started to form. The solution was refluxed for two hours, allowed to cool to room temperature, and the precipitate was collected by suction filtration. The product was washed on the filter several times with hot water, allowed to air dry overnight, and finally dried in vacuo (0.2 mm. Hg) at 100° C. to obtain a 33 g. (theory 33.5 g.) yield of a slightly greenish-yellow solid, M.P. greater than 300° C.

A sample for elemental analysis was recystallized from glacial acetic acid and dried in vacuo (0.2 mm. Hg.) for four hours at 100° C. Elemental analysis for $C_{15}H_{10}N_2O_5$. Calculated (percent): C, 67.67; H, 3.76; N, 10.52. Found (percent): C, 67.71; H, 3.67; N, 9.23.

The infrared spectrum of the material had absorption bands at 3400, 2500, 1690, 1615 cm.$^{-1}$, etc., indicative of the desired 2 - (p-hydroxyphenyl) - 6-carboxyquinoxaline having the formula:

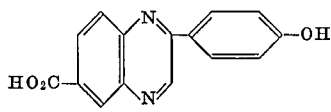

The compound 2 - (p - hydroxyphenyl) - 6 - carboxyquinoxaline was reacted at reflux for 2 hours with excess acetic anhydride to prepare 2-(p-acetoxyphenyl)-6-carboxyquinoxaline. The crude product was recrystallized from dilute acetic acid and dried in vacuo at 100° C. for 4 hours to obtain an analytical sample of 2-(p-acetoxyphenyl)-6-carboxyquinoxaline having a melting point of 222–225° C. Elemental analysis for $C_{17}H_{12}N_2O_4$. Calculated (percent): C, 66.23; H, 3.89; N, 9.09. Found (percent): C, 65.78; H, 4.00; N, 8.60. The structural formula for the compound is:

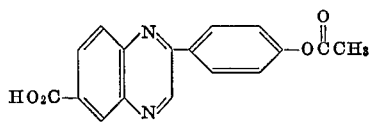

A sample of this monomeric quinoxaline compound was heated (nitrogen atmosphere) for one hour at 250–280° C. and for one hour in vacuo (0.5 mm. Hg) at 300° C. to obtain a red-colored polymer having the following structure:

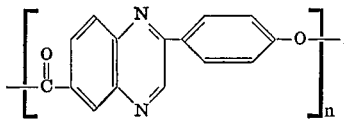

The infrared spectrum of the polymer, which was readily soluble in concentrated sulfuric acid, had absorption bands indicative of ester and quinoxaline residues.

Differential thermal and thermogravimetric analysis showed the polymer softened at 450° C. and was stable at temperatures above 500° C. (only 10% weight loss) in either nitrogen or air.

Although the invention has been described in considerable detail with reference to certain preferred embodiments thereof, it will be under stood that variations and modifications can be effected within the spirit and scope of the invention as described hereinabove and as defined in the appended claims.

I claim:
1. A film and fiber forming polyester consisting essentially of recurring units having the formula:

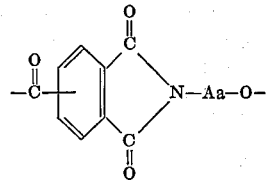

wherein Ar is phenylene.

2. A film and fiber forming polyester consisting essentially of recurring units having the formula:

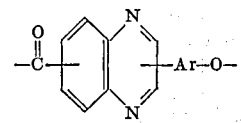

wherein Ar is phenylene.

3. A film and fiber forming polyester consisting essentially of recurring units having the formula:

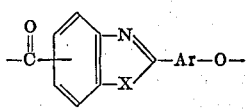

wherein X is O, S, or N-H, and Ar is phenylene.

4. A film and fiber forming polyester consisting essentially of recurring units of the formula:

wherein R is a divalent radical consisting essentially of units having the formula:

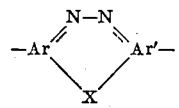

wherein X is O, S, or N-H, and each of Ar and Ar' is phenylene.

5. A film and fiber forming polyester consisting essentially of recurring units of the formula:

wherein R is a divalent radical units having the formula:

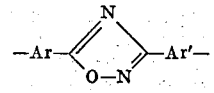

wherein each of Ar and Ar' is phenylene.

References Cited

UNITED STATES PATENTS

| | | | |
|---|---|---|---|
| 2,551,731 | 5/1951 | Drewitt et al. | 260—75 |
| 2,600,376 | 6/1952 | Caldwell | 260—47 |
| 2,699,438 | 1/1955 | Bock et al. | 260—78.3 |
| 3,060,191 | 10/1962 | Kolb et al. | 260—326 |

WILLIAM H. SHORT, Primary Examiner

L. L. LEE, Assistant Examiner

U.S. Cl. X.R.

117—161; 260—30.8, 75, 78.3, 250, 260, 302, 304, 307, 308, 309.2, 326, 473, 475, 521

UNITED STATES PATENT OFFICE
CERTIFICATE OF CORRECTION

Patent No. 3,542,731            Dated November 24, 1970

Inventor(s) Billy M. Culbertson

It is certified that error appears in the above-identified patent and that said Letters Patent are hereby corrected as shown below:

Column 6, line 44, that portion of the formula reading "C-Ar-C-" should read -- C-Ar-O- --. Column 11, line 60, "450°C." should read --460°C.--. Column 12, claim 1, that portion of the formula reading "N-Aa-O-" should read -- N-Ar-O- --.

Signed and sealed this 18th day of January 1972.

(SEAL)
Attest:

EDWARD M. FLETCHER, JR.        ROBERT GOTTSCHALK
Attesting Officer               Acting Commissioner of Patent